(12) United States Patent
Hsu et al.

(10) Patent No.: US 7,082,269 B2
(45) Date of Patent: Jul. 25, 2006

(54) INTERFACE CIRCUIT FOR A FIBER TRANSCEIVER

(75) Inventors: Chao-Hsiou Hsu, MiaoLi (TW); Chen-Chih Huang, Hsinchu (TW)

(73) Assignee: Realtek Semiconductor Corp. (TW)

( * ) Notice: Subject to any disclaimer, the term of this patent is extended or adjusted under 35 U.S.C. 154(b) by 683 days.

(21) Appl. No.: 10/211,698

(22) Filed: Aug. 2, 2002

(65) Prior Publication Data
US 2003/0035176 A1    Feb. 20, 2003

(30) Foreign Application Priority Data
Aug. 14, 2001    (TW)    ............................... 90119970 A

(51) Int. Cl.
*H04B 10/06*    (2006.01)
(52) U.S. Cl. ...................... 398/202; 398/134
(58) Field of Classification Search ................ 398/135, 398/202, 214
See application file for complete search history.

(56) References Cited

U.S. PATENT DOCUMENTS
6,060,890 A * 5/2000 Tsinker ...................... 324/676

* cited by examiner

*Primary Examiner*—David C. Payne
(74) *Attorney, Agent, or Firm*—Raymond Sun

(57) ABSTRACT

The present invention discloses an interface circuit for a fiber transceiver, comprising: an encoder, for receiving and encoding an input data into an output differential signal; a comparator, for receiving an input differential signal from the fiber transceiver and generating an input signal; a decoder, for receiving the input signal and generating an encoded signal and an input data; and a detector, for receiving the encoded signal and generating a link signal supplied to the decoder to generate the input data.

24 Claims, 6 Drawing Sheets

INTERFACE CIRCUIT FOR A FIBER TRANSCEIVER

BACKGROUND OF THE INVENTION

1. Field of the Invention

The present invention generally relates to an interface circuit for a fiber transceiver and, more particularly, to an interface circuit for a fiber transceiver that is able to reduce the number of I/O pads for receiving a detection differential signal.

2. Description of the Prior Art

FIG. 1 is a schematic block diagram showing a conventional interface circuit for a fiber transceiver. As shown in the figure, when a fiber transceiver is used for receiving a fiber signal, such as a 100 Base-Fx protocol signal, an electronic signal output from a fiber transceiver 11 is received by an electronic signal transceiver 10. The fiber transceiver 11 is connected to fibers 12 and 13, and converts two output differential signals TxP and TxN into an output optic signal Tx. The fiber transceiver 11 also converts an input optic signal Rx into two input differential signals RxP and RxN and two detection differential signals SDP and SDN. The electronic signal transceiver 10 receives the differential signals RxP, RxN, SDP, and SDN from the fiber transceiver 11, and further decodes the output data (data_out) into two differential signals TxP and TxN to be output to the fiber transceiver 11.

FIG. 2 is a control block diagram showing a part of the conventional electronic signal receiver 10 with its interface. As shown in the figure, two output differential signals TxP and TxT are generated by an output driving unit 103 after the output data (data_out) is encoded by an encoder 101. Two input differential signals RxP and RxN are input into an comparator 104 to generate an input signal, which is to be decoded by a decoder 102 to be an decoded data RxD. The decoded data RxD is converted an input data (data_in) according to a link signal L_S. Moreover, two detection differential signals SDP and SDN are input into an comparator 105 to generate the link signal L_S, so as to control the decoder 102. In other words, when a package data RX is input, the fiber transceiver 11 outputs the detection differential signals SDP and SDN such that the link signal L_S is enabled. Therefore, the decoder 102 outputs the decoded data RxD as an output data (data_in) according to the link signal L_S.

Generally, the higher integrity that I/O ports in the electronic signal receiver 10 has; for the example of 16 I/O ports, the more I/O pads on a chip of the electronic signal receiver 10 have. Therefore, the size of the electronic signal receiver 10 cannot be minimized, and the manufacturing cost cannot be reduced.

SUMMARY OF THE INVENTION

Accordingly, it is the primary object of the present invention to provide an interface circuit for a fiber transceiver that is able to generate a link control signal without receiving a detection differential signal.

It is another object of the present invention to provide an interface circuit for a fiber transceiver that is able to reduce the number of I/O pads for receiving a detection differential signal.

In order to achieve the foregoing object, the present invention provides an interface circuit for a fiber transceiver, comprising: an encoder, for receiving and encoding an input data into an output differential signal; a comparator, for receiving an input differential signal and generating an input signal; a decoder, for receiving the input signal and generating an encoded signal and an input data; and a detector, for receiving the encoded signal and generating a link signal supplied to the decoder to generate the input data.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

The present invention providing an interface circuit for a fiber transceiver can be exemplified by the preferred embodiment as described hereinafter.

Figure 1:
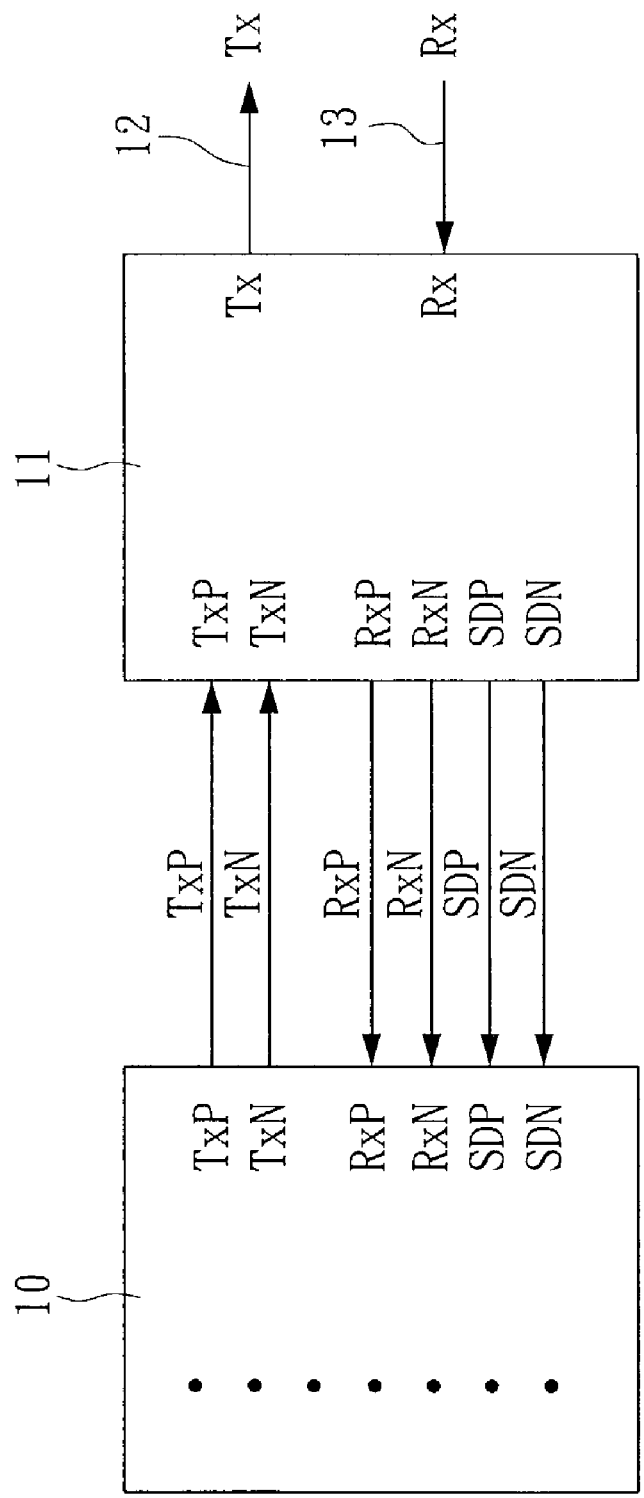
FIG. 1 is a schematic block diagram showing a conventional interface circuit for a fiber transceiver in accordance with the prior art.
Figure 3:
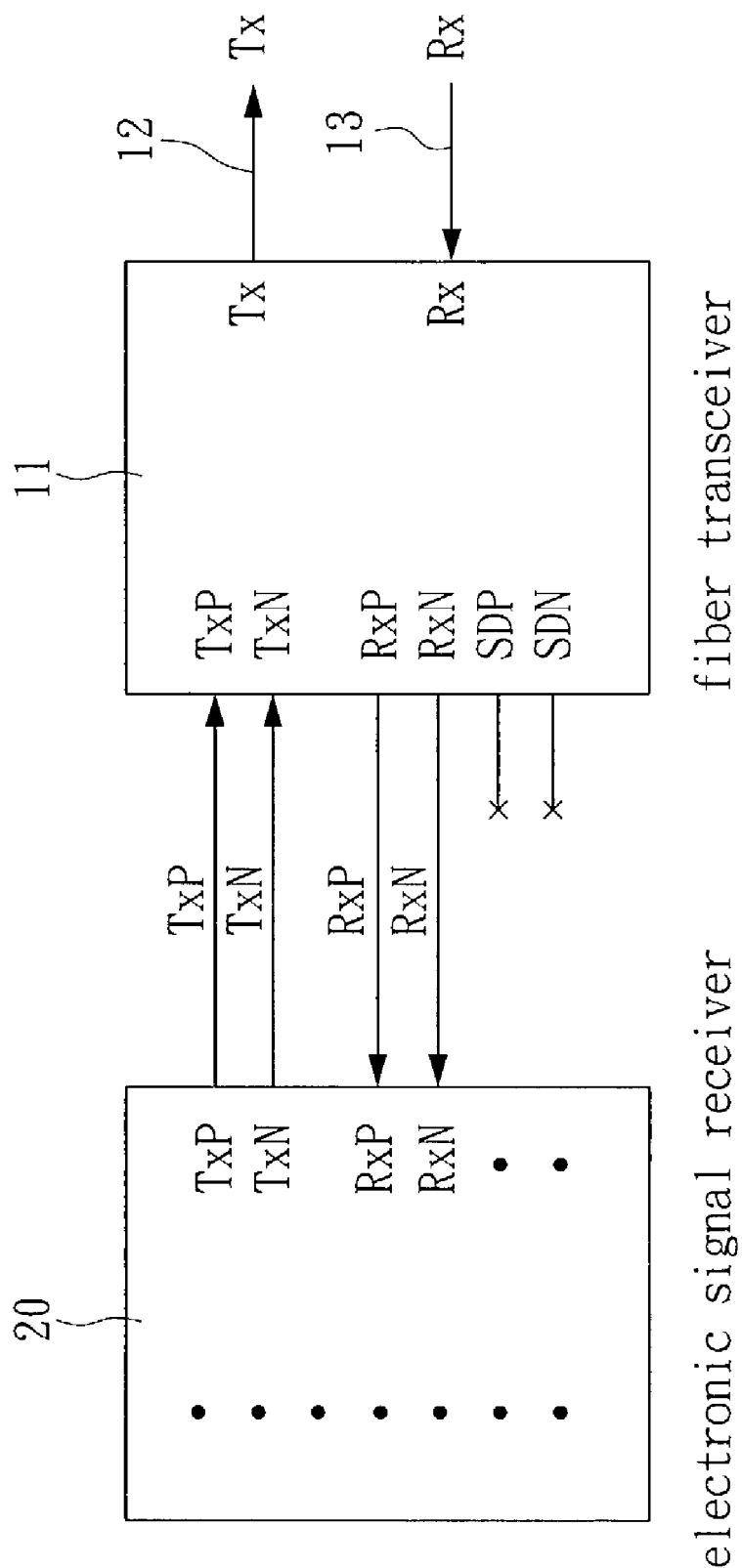
FIG. 3 is a schematic block diagram showing an interface circuit for a fiber transceiver in accordance with the present invention.

Please refer to FIG. 3, which is a schematic block diagram showing an interface circuit for a fiber transceiver in accordance with the present invention. In the FIG. 3, an electronic signal receiver 20 of the interface circuit for a fiber transceiver according to the present invention transmits two output differential signals TxP and TxN to a fiber transceiver 11, and receives two input differential signals RxP and RxN transmitted from the fiber transceiver 11. The interface circuit for a fiber transceiver of the present invention is different from the conventional interface circuit for a fiber transceiver (as shown in FIG. 1) in that the interface circuit for a fiber transceiver of the present invention does not require two detection differential signals SDP and SDN as required in the conventional fiber transceiver 11. Therefore, the number of I/O pads of the electronic signal receiver 20 of the interface circuit for a fiber transceiver according to the present invention can be significantly reduced. For example, a 16-port electronic signal receiver 20 of the interface circuit for a fiber transceiver according to the present invention can reduce 32 I/O pads.

Figure 2:
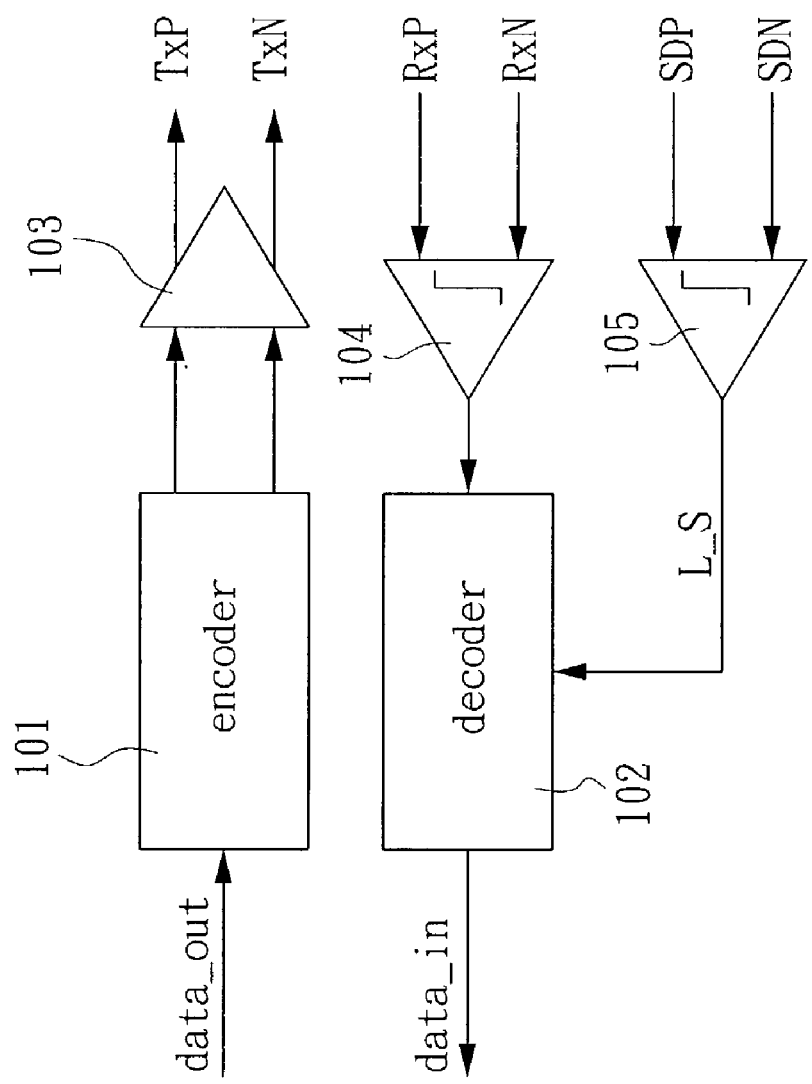
FIG. 2 is a detailed block diagram showing a part of the conventional electronic signal receiver with its interface.
Figure 4:
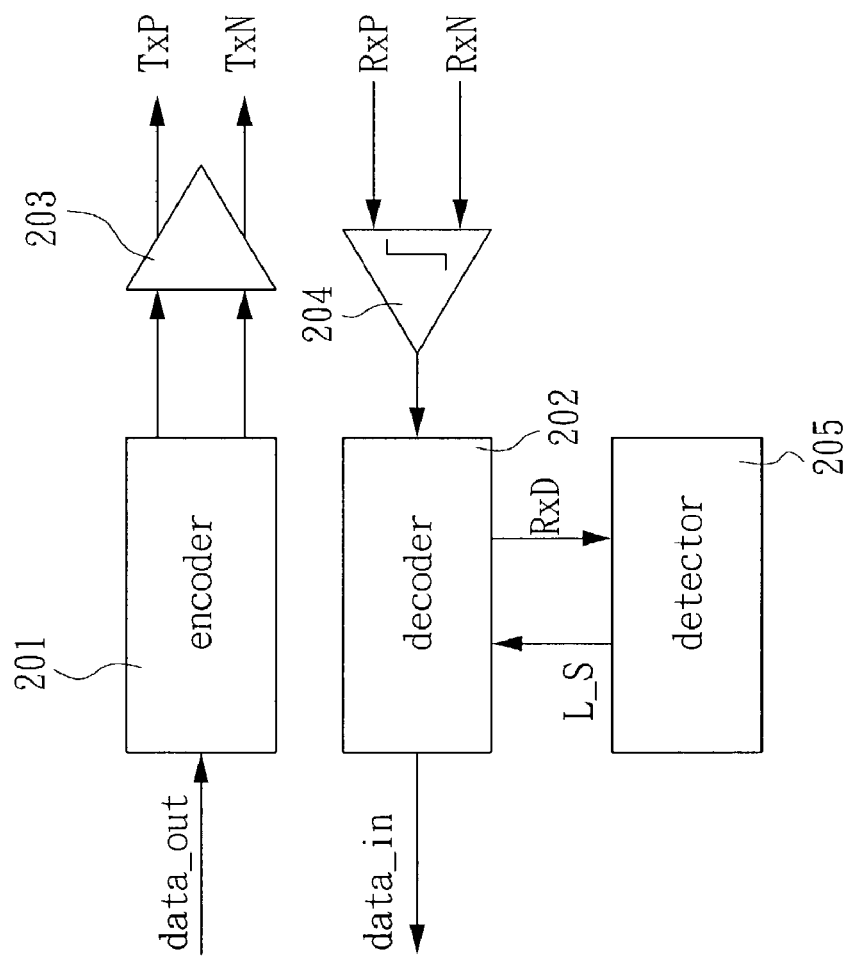
FIG. 4 is a detailed block diagram showing a part of the electronic signal receiver with its interface in accordance with the present invention.

FIG. 4 is a detailed block diagram showing a part of the electronic signal receiver 20 with its interface, in which only a port is shown. In the figure, a single-port interface circuit for a fiber transceiver comprises an encoder 201, a decoder 202, an output driving unit 203, an comparator 204, and a detector 205. The encoder 201, the decoder 202, the output driving unit 203, and the comparator 204 of the interface circuit are similar to the corresponding devices in the conventional interface circuit (as shown in FIG. 2). Therefore, repeated description on these devices is omitted.

The detector 205 in FIG. 4 receives a decoded signal RxD generated by the decoder 202, and further detects whether there is a plurality of patterns of the waiting signals (idle signal) outputted. If the detector 205 detects that there are a plurality of patterns of waiting signals outputted, it means the subsequent data is an effective package data, which is stable. Therefore, a link signal L_S is enabled. Accordingly, the link signal L_S generated by the detector 205 is the same as a link control signal L_S for a conventional interface circuit for a fiber transceiver, as shown in FIG. 2. The decoder 202 generates a correct input data (data_in) according to the link signal L_S. The way the decoder 202 generates a correct input data (data_in) according to the link signal L_S is similar to the prior art; therefore, it is omitted.

Figure 5:
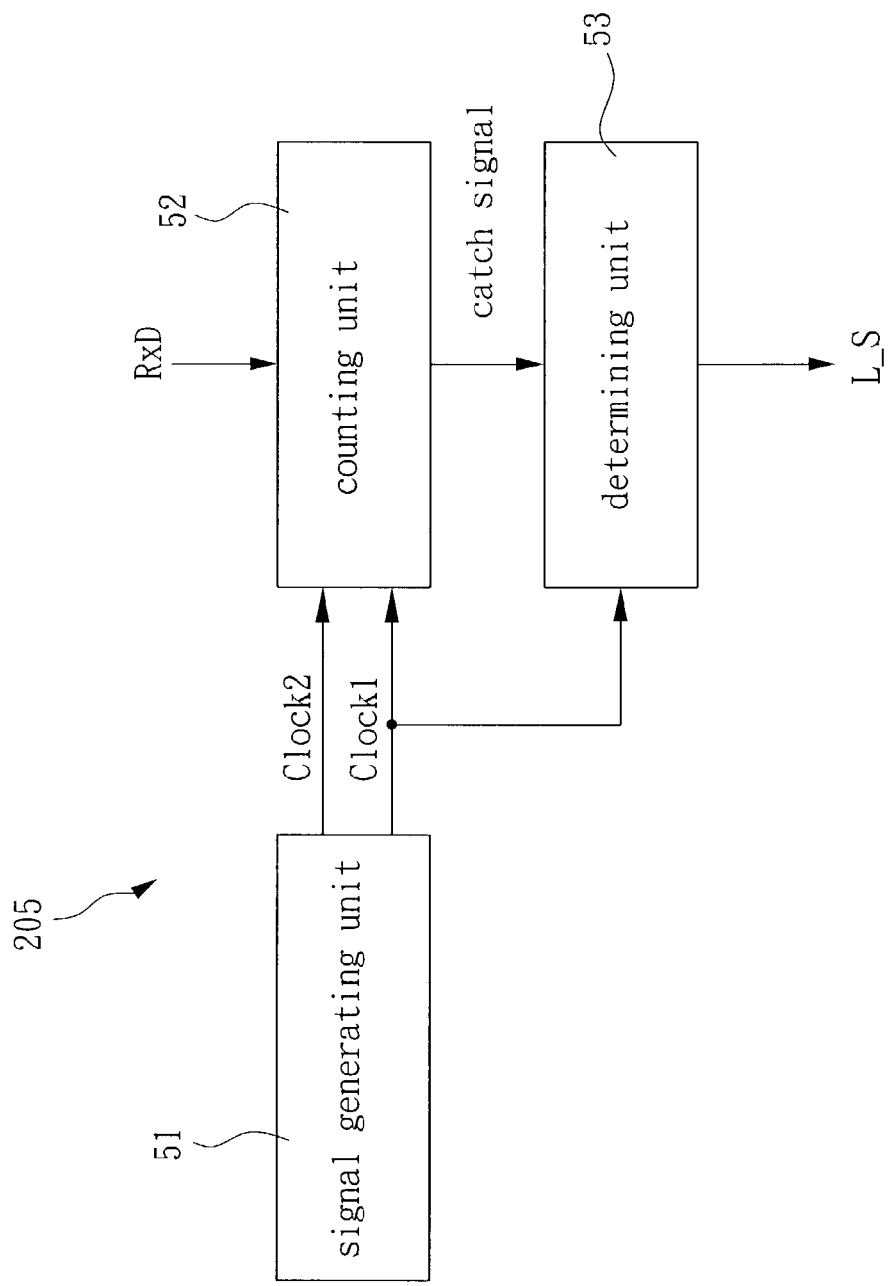
FIG. 5 is a detailed block diagram showing a detector in FIG. 4 according to one embodiment of the present embodiment.

FIG. 5 is a detailed block diagram showing the detector 205 in FIG. 4. In the present embodiment, the decoded signal RxD is a 100 Base-Fx protocol signal (It is just a example and can be any other protocol). In the 100 Base-Fx protocol, there is a plurality of waiting signals (idle signals) before transmitting an data package. Therefore, in the present embodiment, as long as 10 continuous waiting signals (idle signals) are detected, the transmitted signal can be stably linked. In other words, the link signal L_S can be enabled (or disabled). In the 100 Base-Fx protocol, the pattern of the waiting signal is 11111, and the transmission time for each data package is less than 2 ms. So the waiting signals of the decoded signal RxD is 11111.

As shown in FIG. 5, the detector 205 comprises a signal generating unit 51, a counting unit 52, a determining unit 53, and an output unit 54. The signal generating unit 51 generates a first reference clock pulse (clock1), and a second reference clock pulse (clock2). The frequencies for the reference clock pulses are determined according to the protocol. In the 100 Base-Fx protocol of the present embodiment, the cycle of the first reference clock pulse (clock1) is 10 ms, and the frequency of the second reference clock pulse (clock2) is 125 MHz. Certainly, the frequency of the first reference clock pulse (clock1) is adjustable. The counting unit 52 resets a catch signal when the first reference clock pulse (clock1) reaches a positive edge, and samples and counts the decoded signal RxD to check whether there are fifty continuous signals "1" (i.e., ten continuous waiting patterns) (just a example, it can be any other pattern). If the counting unit 52 detects that the decoded signal RxD has fifty continuous signals "1", the catch signal is enabled.

The determining unit 53 generates a link signal L_S according to the catch signal and the first reference clock pulse (clock1). In other words, the determining unit 53 determines whether the catch signal is enabled when the first reference clock pulse (clock1) reaches a negative edge. If the catch signal is enabled, a link signal L_S is enabled. Otherwise, the link signal L_S is reset (disabled). To sum up, the detector 205 generates a link signal L_S according to the waiting patterns of the decoded signal RxD without receiving any detection differential signals SDP and SDN.

Figure 6:
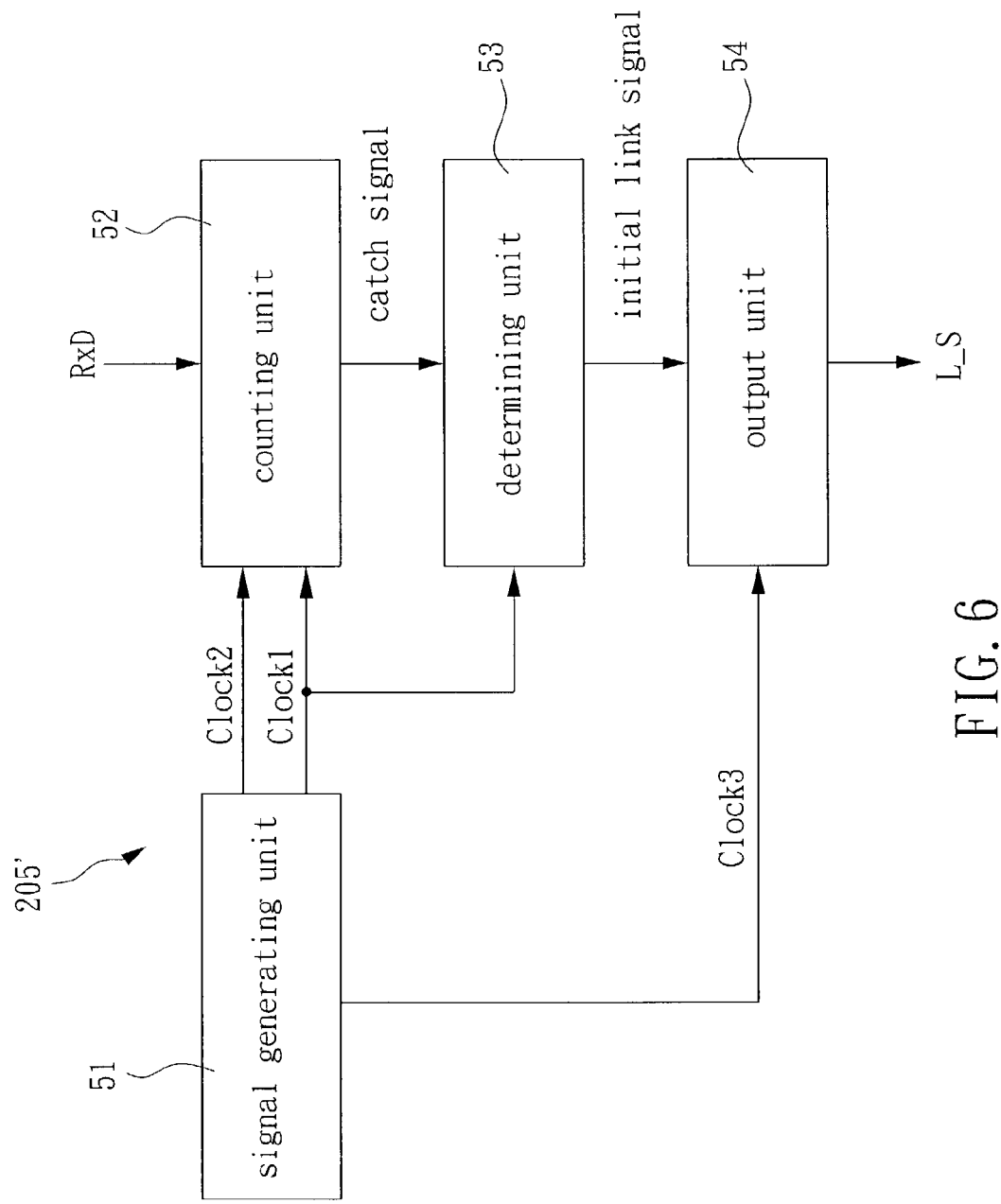
FIG. 6 is a detailed block diagram showing another detector in FIG. 4 according to another embodiment of the present embodiment.

FIG. 6 is a detailed block diagram showing another detector in FIG. 4 according to another embodiment of the present embodiment. The detector 205' in FIG. 6 is similar to the detector 205 in FIG. 5 with the difference that the link signal L_S is not affected by any noise. The determining unit 53 generates an initial link signal when the catch signal is enabled and the first reference clock pulse (clock1) reaches a negative edge. Then, the output unit 54 employs a positive edge (or a negative edge) of a third reference clock pulse (clock3) to sample the initial link signal, and determines the link signal L_S according to the initial link signal. The cycle of the third reference clock pulse (clock3) is 500 μs.

According to the above discussion, the present invention discloses an interface circuit for a fiber transceiver that is able to reduce the number of I/O pads for receiving a detection differential signal. Therefore, the present invention has been examined to be progressive, advantageous and applicable to the industry.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An interface circuit for a fiber transceiver, comprising:
   a comparator, for receiving an input differential signal from said fiber transceiver and generating an input signal;
   a decoder, for receiving said input signal and generating an encoded signal and an input data; and
   a detector, for receiving said encoded signal and generating a link signal supplied to said decoder to generate said input data.

2. The interface circuit as recited in claim 1, wherein said interface circuit further comprises:
   an encoder, for receiving and encoding an input data into an output differential signal.

3. The interface circuit as recited in claim 1, wherein said detector further comprises:
   a signal generating unit, for generating a reference clock;
   a counting unit, for resetting a catch signal and detecting if said encoded signal has a plurality of continuous waiting signals when said first reference clock pulse reaches a positive edge, and enabling said catch signal when said plurality of continuous waiting signals are detected; and
   a determining unit, for sampling said catch signal when said first reference clock pulse reaches a negative edge, and determining said link control signal according to the state of said catch signal.

4. The interface circuit as recited in claim 1, wherein said detector further comprises:
   a signal generating unit, for generating a reference clock;
   a counting unit, for resetting a catch signal and detecting if said encoded signal has a plurality of continuous waiting signals when said first reference clock pulse reaches a negative edge, and enabling said catch signal when said plurality of continuous waiting signals are detected; and
   a determining unit, for sampling said catch signal when said first reference clock pulse reaches a positive edge, and determining said link control signal according to the state of said catch signal.

5. The interface circuit as recited in claim 3, wherein said encoded signal is a 100 Base-Fx protocol signal.

6. The interface circuit as recited in claim 4, wherein said encoded signal is a 100 Base-Fx protocol signal.

7. The interface circuit as recited in claim 5, wherein said counting unit enables said catch signal when said counting unit received a series of fifty data 1's.

8. The interface circuit as recited in claim 6, wherein said counting unit enables said catch signal when said counting unit received a series of fifty data 1's.

9. The interface circuit as recited in claim 2, wherein said detector further comprises:
   a signal generating unit, for generating a reference clock;
   a counting unit, for producing a catch signal in response to said reference clock from said signal generating unit and a plurality of waiting signal of said encoded signal from said decoder; and
   a determining unit, for producing said link signal in response to said catch signal from said counting unit and said reference clock from said signal generating unit.

10. The interface circuit as recited in claim 9, wherein said encoded signal is a 100 Base-Fx protocol signal.

11. The interface circuit as recited in claim 10, wherein said plurality of waiting signal is a series of fifty data 1's.

12. A decoding apparatus in an interface circuit for a fiber transceiver comprising:
   a comparator, for receiving an input differential signal from said fiber transceiver and generating an input signal;
   a decoder, for receiving said input signal from said comparator, and generating an encoded signal, and producing an input data in response to a link signal; and
   a detector, for receiving said encoded signal from said decoder and generating said link signal.

13. The decoding apparatus as recited in claim 12, wherein said detector further comprises:
   a signal generating unit, for generating a reference clock;
   a counting unit, for producing a catch signal in response to said reference clock from said signal generating unit and a plurality of waiting signal of said encoded signal from said decoder; and
   a determining unit, for producing said link signal in response to said catch signal from said counting unit and said reference clock from said signal generating unit.

14. The decoding apparatus as recited in claim 13, wherein said encoded signal is a 100 Base-Fx protocol signal.

15. The decoding apparatus as recited in claim 14, wherein said plurality of waiting signal is a series of fifty data 1's.

16. The decoding apparatus as recited in claim 12, wherein said detector further comprises:
   a signal generating unit, for generating a first clock and a second clock;
   a counting unit, for producing a catch signal in response to said first clock from said signal generating unit and a plurality of waiting signal of said encoded signal from said decoder;
   a determining unit, for producing an initial link signal in response to said catch signal from said counting unit and said first clock from said signal generating unit; and
   an output unit, for receiving said initial link signal and said second clock, and outputting said link signal.

17. The decoding apparatus as recited in claim 16, wherein said encoded signal is a 100 Base-Fx protocol signal.

18. A decoding apparatus in an interface circuit for outputting an input data according to an input differential signal outputted by a fiber transceiver, comprising:
   a comparator for receiving the input differential signal and generating an input signal;
   a decoder for processing the input signal and thereby generating a decoded signal; and
   a detector for detecting whether the decoded signal matches a predetermined pattern and thereby generating a detection signal;
   wherein the decoder generates the input data and the decoding apparatus outputs the input data in response to the detection signal.

19. The decoding apparatus as recited in claim 18, wherein the decoder generates the input data in response to the detection signal.

20. The decoding apparatus as recited in claim 19, wherein the decoder generates the input data if the detection signal indicates the decoded signal matches the predetermined pattern.

21. The decoding apparatus as recited in claim 18, wherein the decoded signal is a 100 Base-Fx protocol signal.

22. The decoding apparatus as recited in claim 18, wherein the predetermined pattern is a series of fifty data 1's.

23. The decoding apparatus as recited in claim 18, wherein the detector further comprises:
   a counting unit, for producing a catch signal in response to the decoded signal and a reference clock; and
   a determining unit, for producing the detection signal according to the catch signal and the reference clock;
   wherein the determining unit produces the detection signal by determining whether the catch signal matches the predetermined pattern.

24. The decoding apparatus as recited in claim 23, wherein the detector further comprises a clock generating unit for generating the reference clock.

* * * * *